US006902675B2

(12) United States Patent
Kelly et al.

(10) Patent No.: US 6,902,675 B2
(45) Date of Patent: Jun. 7, 2005

(54) METHOD TO CONTROL OFF-FLAVOR IN WATER AND AQUACULTURE PRODUCTS

(75) Inventors: Anita M. Kelly, Starkville, MS (US); Tor P. Schultz, Starkville, MS (US)

(73) Assignee: Mississippi State University, Mississippi State, MS (US)

(*) Notice: Subject to any disclaimer, the term of this patent is extended or adjusted under 35 U.S.C. 154(b) by 35 days.

(21) Appl. No.: 10/274,518

(22) Filed: Oct. 18, 2002

(65) Prior Publication Data

US 2003/0121859 A1 Jul. 3, 2003

Related U.S. Application Data

(60) Provisional application No. 60/330,078, filed on Oct. 19, 2001.

(51) Int. Cl.[7] .............................................. B01D 1/100

(52) U.S. Cl. ....................... 210/634; 210/691; 426/429; 426/486; 426/487; 426/488; 426/643

(58) Field of Search ................................. 210/634, 638, 210/639, 691–693; 426/425, 429, 486–468, 643

(56) References Cited

U.S. PATENT DOCUMENTS

| 3,676,357 | A | * | 7/1972 | Ciuti et al. ................. 502/402 |
| 3,888,766 | A | * | 6/1975 | De Young ................... 210/680 |
| 4,398,937 | A | | 8/1983 | van Aller et al. |
| 4,926,795 | A | | 5/1990 | Hamilton et al. |
| 5,395,535 | A | * | 3/1995 | Pinckard ..................... 210/691 |
| 6,063,287 | A | | 5/2000 | Smith et al. |
| 6,322,782 | B1 | | 11/2001 | Walker et al. |

OTHER PUBLICATIONS

Aschner, M., C. Laventer, and I. Chorin–Kirsch. 1969. Off flavour in carp from fish ponds in the coastal plain and the Galil. Bamidgeh 19:23–25.

Engle, C.R., G.L. Pounds, and M. Van Der Ploeg. 1995. The cost of off–flavor. Journal of the World Aquaculture Society 26:297–306.

Farmer, L.J., J.M. McConnell, T.D.J. Hagan, and D.B. Harper. 1995. Flavour and off–flavour in wild and farmed Atlantic salmon from locations around Northern Ireland. Water Science Technology 31:259–264.

Gerber, N.N. 1968. Geosmin from microorganisms in trans–1,10–dimethyl–trans–9–decalol, Tetrahedron Letters 25:2971–2974.

Gerber, N.N. 1969. A volatile metabolite of actinomycetes, 2–methylisobomeol. Journal of Antibiotics 22:508–509.

Gerber, N.N. and H.A. Lechevalier. 1965. Geosmin, an earthly–smelling substance isolated from actinomycetes. Applied Microbiology 13:935–938.

Keenum, M.E. and J.E. Waldrop. 1988. Economic analysis of farm–raised catfish production in Mississippi. Mississippi Agricultural and Forestry Experiment Station, Technical Bulletin 155.

Lovell, R.T., I.Y. Lelana, C.E. Boyd, and M.S. Armstrong. 1986. Geosmin and musty–muddy flavors in pond–raised channel catfish. Transactions of the American Fisheries Society 115:485–489.

(Continued)

Primary Examiner—Joseph Drodge
(74) Attorney, Agent, or Firm—Lawrence Arthur Schemmel

(57) ABSTRACT

This invention relates to a method to extract terpenoids in aquatic environments by using a hydrophobic absorbent, thus reducing or eliminating off-flavor in water and aquaculture products which is caused by cyanobacteria-produced terpenoids.

59 Claims, 6 Drawing Sheets

OTHER PUBLICATIONS

Martin, J.F., L.W. Bennett, and W.H. Graham. 1988a. Off-flavor in the channel catfish (*Ictalurus punctatus*) due to 2–methylisobrneol and its dehydration products. Water Science Technology 20:99–105.

Martin, J.F., G. Izaguirre, and P. Waterstrat. 1991. A planktonic Oscillatoria species from Mississippi catfish ponds that produces the off–flavor compound 2–methylisoborneol. Water Research 25:1447–1451.

Martin, J.F., C.P. McCoy, C.S. Tucker, and L.W. Bennett. 1988b. 2–Methylisoborneol implicated as a cause of off–flavour in channel catfish, *Ictalurus punctatus* (Rafinesque), from commercial culture ponds in Mississippi. Aquaculture and Fisheries Management 19;151–157.

McLarney, W.O. 1984. The Freshwater Aquaculture Book. Hartley & Marks, Inc., Point Roberts, WA.

Tabachek, J.L., and M. Yurkowski. 1976. Isolation and identification of blue–green algae producing muddy odor metabolites, geosmin, and 2–methylisoborneol, in saline takes in Manitoba. Journal Fisheries Research Board of Canada 33:25–35.

Van Der Ploeg, M., C.S. Tucker, and C.E. Boyd. 1992. Geosmin and 2–methylisoborneol production by cyanobacteria in fish ponds in the southeastern United States. Water Science Technology 25:283–290.

Yurkowski, M. and J.L. Tabachek. 1974. Identification, analysis, and removal of geosmin from muddy–flavored trout. Journal Fisheries Research Board of Canada 31:1851–1858.

Lazur, A. M. and D. C. Britt. Pond Recirculating Production Systems. Southern Regional Aguaculture Center. Nov. 1997.

Lovell, R. T. and L. A. Sackey. Absorption by Channel Catfish of Earthy–musty Flavor Compounds Synthesized by Cultures of Blue–green Algae. Trans. Amer. Fish Soc. 4, 1973. pp. 774–777.

Aquaculture Magazine. Off–Flavor—It's Still With Us. Nov./Dec. 1997. pp. 20–21.

Avault, J. W. Off–Flavor of Channel Catfish: Some Fundamentals Reviewed. Aquaculture Magazine. Nov./Dec. 1996. pp. 62–64.

Johnsen. P. B. and S. W. Lloyd. Influence of Fat Content on Uptake and Depuration of the Off–flavor 2–Methylisoborneol by Channel Catfish (*Ictalurus punctatus*) Can. J. Fish. Aquat. Sci. 49. 1992. pp. 2406–2411.

Tucker, C. S. Off–Flavor Problems in Aquaculture. Reviews in Fisheries Science. 8(1): 45–88. Note: Only Pages regarding geosmin and MIB included.

Heikes, D. In–Pond Purging For Catfish With Off–Flavor. Aquaculture Magazine. Jul./Aug., 1993. pp. 28–32.

Tucker, C. S. and M. Van Der Ploeg. Off–flavor Channel Catfish Update. Aquaculture Magazine. 17(3). May/Jun. 1991. pp. 24–31.

Maligalig, L.L., J.F. Caul, and O.W. Tiemeier. 1973. Aroma and flavor of farmer–raised channel catfish: effects of pond condition, storage, and diet. Food Product Development 7:86–92.

* cited by examiner

METHOD TO CONTROL OFF-FLAVOR IN WATER AND AQUACULTURE PRODUCTS

CROSS-REFERENCE TO RELATED APPLICATION

This application is a regular National application claiming priority from Provisional Application, U.S. Application Ser. No. 60/330,078 filed Oct. 19, 2001. The entirety of that provisional application is incorporated herein by reference.

FIELD OF THE INVENTION

The invention relates to a novel method of extraction of terpenoids in aquatic environments by utilizing a hydrophobic absorbent to reduce or eliminate earthy, musty, or muddy off-flavor in water and aquaculture products, thus controlling the cyanobacteria-produced terpenoids that cause off-flavor.

BACKGROUND OF THE INVENTION

Aquaculture produced fish, such as catfish, are susceptible to developing an undesirable off-flavor that causes unpalatability and delays commercial production. Off-flavor is often considered the most significant problem within the catfish industry since, at certain times of the year, over 75% of all production ponds may contain fish that are not marketable due to unacceptable flavor quality. Off-flavor is the result of absorption by fish of hydrophobic terpenoids which are produced by cyanobacteria, *Oscillatoria* species (cyanobacteria are commonly referred to as blue-green algae). Geosmin (trans-1,10-dimethyl-trans-9-decalol) and 2-methylisoborneol (MIB) are two of the known hydrophobic terpenoids produced by cyanobacteria. Other hydrophobic terpenoids may be produced by blue-green algae, either directly as metabolites or as secondary products from metabolites including 2-isopropyl-2-methyloxypyrazine.

Low levels of these terpenoids accumulate in the tissues of catfish, resulting in an undesirable earthy, musty, or muddy flavor. High levels of these terpenoids give fish a turpentine flavor. In addition to catfish, these same terpenoids likewise affect other aquaculture products.

Identification of the specific chemical agents responsible for the earthy/musty off-flavors became possible with the development of analytical separation techniques. In the mid-1960s, gas chromatography was used to identify two terpenoids, geosmin and MIB, as the most common earthy/musty compounds found in cultures of actinomycetes (Gerber, N. N. and Lechevalier, H. A., 1965, *Applied Microbiology* 13: 935–938; Gerber, N. N., 1968, *Tetrahedron Letters* 25: 2971–2974; Gerber, N. N., 1969, *Journal of Antibiotics* 22: 508–509). These two compounds would later be implicated as the most common causes of flavor problems in aquaculture.

Aschner, M. et al. provided one of the first comprehensive accounts of earthy/musty off-flavors in fish produced in aquaculture (Aschner, M. et al., 1969, *Bamidgeh* 19: 23–25). They reported that the cyanobacterium *Oscillatoria tenuis* was associated with earthy off-flavors in common carp grown in ponds in Israel. They suggested that fish acquired the off-flavor either by absorption of an unidentified odorous compound from the water or by consumption of the cyanobacteria masses. They noted that the flavor problem could be alleviated by killing the cyanobacteria with an algicide or by transferring off-flavored fish to clean water. Subsequently, earthy/musty off-flavors were reported in channel catfish grown in ponds in Alabama (Lovell, R. T. and Sackey, L. A., 1973, *Trans. Amer. Fish. Soc.* 4: 774–777) and in Kansas (Maligalig, L. L. et al., 1973, *Food Product Development* 7: 86–92). Geosmin produced by cyanobacteria was later found to be the major cause of the off-flavor in Alabama, with MIB also adversely affecting flavor (Lovell, R. T., et al., 1986, *Transactions of the American Fisheries Society* 115: 485–489). Off-flavors are also common in pond-raised channel catfish in northwest Mississippi; however, MIB, rather that geosmin, has been reported as the primary cause of off-flavor in Mississippi catfish (Martin, J. F., et al., 1988a, *Water Science Technology* 20: 99–105; Martin, J. F., et al., 1988b, *Aquaculture and Fisheries Management* 19: 151–157; Van der Ploeg, M., et al., 1992, *Water Science Technology* 25: 283–290). Martin, J. F. et al. also identified a planktonic cyanobacterium—strongly resembling and tentatively identified as *Oscillatoria* cf. *chalybea*, which has been implicated in taste and odor problems in drinking water reservoirs—as the producer of MIB in Mississippi catfish ponds (Martin, J. F., et al., 1991, *Water Research* 25: 1447–1451).

Earthy/musty off-flavors exist in aquaculture products other than channel catfish raised in the United States. It appears that off-flavors may occur in any species of fish or shellfish raised in most of the commonly-used aquaculture systems. For example, earthy/musty off-flavors have been reported from such widely-different species and geographical regions as rainbow trout raised in freshwater and saline lakes in central and western Canada (Yurkowski, M. and Tabachek, J. L., 1974, *Journal Fisheries Research Board of Canada* 31: 1851–1858; Tabachek, J. L. and Yurkowski, M., 1976, *Journal Fisheries Research Board of Canada* 33: 25–35), common carp from fish ponds in Israel (Aschner, M. et al., 1969, *Bamidgeh* 19: 23–25), wild and farmed Atlantic salmon from locations in Northern Ireland, the Republic of Ireland, and Scotland (Farmer, L. J., et al., 1995, *Water Science Technology* 31: 259–264), and tilapia from indoor and outdoor pools in the northeastern United States (McLarney, W. O., 1984, *The Freshwater Aquaculture Book*, Hartley & Marks, Publishers, Point Roberts, Wash.).

Cyanobacteria are responsible for most of the off-flavors encountered in aquaculture. Therefore, preventative measures usually focus on management toward elimination of that group of organisms. Copper-based algicides have long been used in supplies of drinking water and are currently the most commonly used algae-control agents approved for use in aquaculture. However, a relatively small margin of safety exists between concentrations of copper that are toxic to algae but are still safe for the aquaculture product being produced, such as catfish. Moreover, the toxicity of copper to all aquatic organisms is strongly influenced by complex interactions with environmental variables such as pH, water temperature, and concentrations of calcium and dissolved organic matter. These largely unknown interactions have made consistently safe and effective copper treatments for algae control almost impossible. As a result, acceptable copper levels have been based mainly on trial and error. Additionally, the United States Environmental Protection Agency may shortly restrict copper use in aquatic systems in the U.S.

The terpenoids produced by cyanobacteria are released into the water and absorbed mainly through the gills of fish. The chemicals are then absorbed by the lipid-rich tissues of fish, thereby causing the undesired off-flavor. The length of time that the fish remain off-flavor depends on temperature, the concentration of off-flavor chemicals in the water, and the amount of fatty tissue in the fish. For channel catfish, the sensory threshold is estimated to be 8 $\mu$g/kg and 0.7 $\mu$g/kg for geosmin and MIB, respectively. At warmer temperatures, fish absorb off-flavor compounds more rapidly than at cooler temperatures but also eliminate them faster. Most off-flavor eventually disappears, but off-flavor episodes may last from months to years.

A previous approach (U.S. Pat. No. 4,398,937) uses selective algaecides to control cyanochloronta (blue-green algae) in various bodies of water and, consequently, to control the associated earthy, musty flavors in fish and other cultured organisms. Another approach to the off-flavor problem involves transferring off-flavor fish to flowing, charcoal-filtered water, the results of which showed improved flavor after 3 days and total flavor restoration in 10 days (Lovell, R. T. and Sackey, L. A., 1973, *Trans. Amer. Fish. Soc.* 4: 774–777). This approach is expensive both in terms of the time and the cost involved, and the charcoal has a limited capacity to adsorb the undesired terpenoids and thus must be replaced fairly frequently. Adsorption is a surface phenomena in which the material taken up is distributed over the surface of the adsorbent, whereas in absorption the material to be taken up is distributed throughout the body of the absorbent. Large volumes of bone charcoal are difficult to obtain and must be recharged using saltwater.

Yet another approach to the problem (U.S. Pat. No. 4,926,795) involves eliminating off-flavor in catfish by treating the aquatic environment with inorganic peroxide additives. This approach claims to achieve flavor reinstatement within 72 hours of treatment.

Another previous approach (U.S. Pat. No. 6,063,287) to reduce the amount of geosmin and MIB in drinking water uses cyclodextrins to sorb the hydrophobic terpenoid. The hydrophobic terpenoid, bounded with cyclodextrin, is then separated from the drinking water. This approach requires the terpenoid-bound cyclodextrin to be separated from the water, requires use of cyclodextrins that are relatively expensive, and would be costly to deploy on a catfish pond or other aquaculture system.

Yet another approach to reducing or eliminating the off-flavor problem in water or aquatic life living in the water (U.S. Pat. No. 6,322,782) relates to treating the water with bioherbicides, specifically the pathogenic bacterium Bacterium NRRLB-30043 (SG-3), for controlling cyanobacteria or algae. The bacterium is used in this approach in an amount sufficient to kill, damage, eliminate, or suppress, and thereby control, the cyanobacteria and/or algae. This approach uses a bacterium that is sensitive to external conditions and is temperamental when in a natural environmental setting.

Although known methods exist to control or reduce off-flavor in aquaculture products, no current technology has proven to be commercially cost effective and efficient. Additionally, introducing bioactive chemical agents such as copper salts to reservoirs or fisheries to control or eliminate algae and off-flavor may be undesirable due to concerns of cost, toxicity, and environmental effects. It remains a significant goal of those skilled in the art to devise a method that controls off-flavor in water and aquaculture products in a cost-effective, environmentally-friendly manner.

The present inventors have designed a method of controlling or eliminating off-flavor in water, fish, and other aquaculture products as a preferred alternative approach that uses no biocides which would linger in the environment or in the fish or that humans will ultimately consume, and thus is environmentally benign.

SUMMARY OF THE INVENTION

As used herein, it is contemplated that the phrase "aquaculture product" refers to products of the cultivation of the natural produce of water including, but not limited to, fish and shellfish. The phrase "off-flavor" refers to unpalatability, undesirable taste and odor of water or aquaculture produced fish, such as catfish, which are susceptible to developing an undesirable off-flavor. The term "terpenoid(s)" refers to any hydrophobic terpenoid or algae-associated odorous compound found in or associated with water or in fish living in the water, including geosmin, MIB, and other compounds produced by blue-green algae, either directly as metabolites or as secondary products from metabolites including 2-isopropyl-2-methyloxypyrazine. The term "water" is intended to include any water containing terpenoids and comprising managed and non-managed bodies of water; fresh water, potable and non-potable; ground and surface water for drinking and irrigation; and water within an aquaculture in any lake, pond, pool, or impoundment, including that used in fish farming. The phrase "hydrophobic absorbent" refers to liquid or solid compounds, either natural or synthetic, that absorb terpenoids and thereby remove such terpenoids from water and aquaculture products.

It is an object of the present invention to provide a method that can be implemented to control terpenoids in water and aquaculture products.

It is a further object of the present invention to provide a method to reduce or eliminate off-flavor from water and aquaculture products.

In various embodiments of the invention, the algae-produced terpenoids to be reduced or eliminated comprises terpenoids including, but not limited to, geosmin, 2-methylisoborneol (MIB), 2-isopropyl-2-methyloxypyrazine, and other related compounds and mixtures thereof which are associated with off-flavor in water and aquaculture products.

It is another object of the present invention to provide a method to control off-flavor in aquaculture products by treating the water with a liquid and/or solid hydrophobic absorbent substance for a period of time to satisfactorily reduce or eliminate terpenoids in the water and thereby reduce or eliminate off-flavor.

It is another object of the present invention to provide a method to control off-flavor in water and aquaculture products by utilizing a liquid and/or solid hydrophobic absorbent substance to treat the water and reduce or eliminate said off-flavor and leaving in place such absorbent to be degraded or evaporated or recovering such absorbent for reuse, disposal, or use in another application.

It is yet another object of the present invention to provide a method to control off-flavor in water and aquaculture products for timely and cost-effective marketing of such products.

It is a further object of the present invention to provide a method to control off-flavor in water and aquaculture products that can be implemented in a cost-effective manner.

It is yet a further object of the present invention to provide a method to control off-flavor in water and aquaculture products that can be implemented in an environmentally-benign manner.

It is a further object of the present invention to provide a method to significantly reduce the level of terpenoids from lakes, ponds, indoor pools, or other impoundments used in aquaculture, thereby reducing the availability of the terpenoids for uptake by the fatty tissue of aquaculture products such as fish.

It is a further object of the present invention to provide a method to significantly reduce the level of terpenoids from lakes, ponds, or other impoundments used for potable water, thereby reducing off-flavor from the water.

With the foregoing and other objects, features, and advantages of the present invention that will become apparent hereinafter, the nature of the invention may be more clearly understood by reference to the following detailed description of the preferred embodiments of the invention and to the appended claims.

DESCRIPTION OF THE PREFERRED EMBODIMENTS

Figure 1:
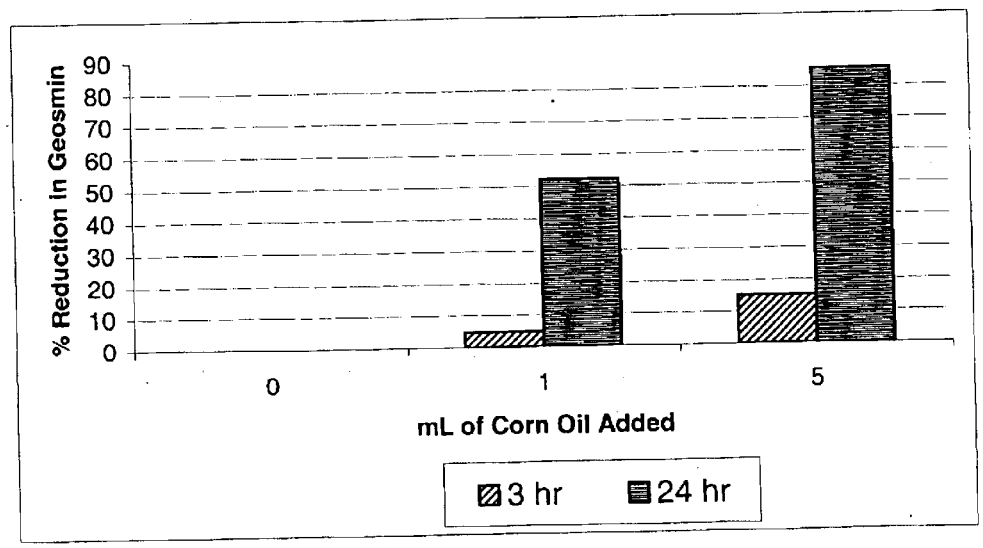
FIG. 1 is a graphical illustration of the percent reduction in geosmin (using 100 parts per billion (ppb) concentration) from 5 gallons of water vs. 0 milliliters (mL) (control), 1 mL, and 5 mL of corn oil added, respectively, measured at a 3-hour and a 24-hour exposure time period.

Various aspects of the present invention provide a method of reducing terpenoid compounds in water and aquaculture products such as fish. In various embodiments of the present invention, the cyanobacteria produced compounds comprise terpenoids including, but not limited to, geosmin, 2-methylisoborneol (MIB), 2-isopropyl-2-methyloxypyrazine, degradation products of geosmin, 2-methylisoborneol (MIB), and 2-isopropyl-2-methyloxypyrazine, and other off-flavor compounds and mixtures thereof known to those of ordinary skill in the art.

Liquid-liquid extraction is defined as a process in which one or more components are removed from a first liquid mixture by intimate contact with a second liquid, which is itself nearly insoluble in the first liquid. The second liquid dissolves the impurities and not the substance that is to be purified. Liquid-liquid extraction may be carried out by simply mixing the two liquids with agitation, and then allowing the two liquids to separate by standing quietly. Alternatively, liquid-liquid extraction may be carried out by simply allowing the two liquids to remain in contact without agitation for a sufficient period of time to allow the impurities to be absorbed by the second liquid.

The principles of liquid-liquid extraction can also be applied to liquid-solid extraction whereby one or more components are removed from a first liquid mixture by intimate contact with an absorbent solid, which is itself nearly insoluble in the first liquid. The absorbent solid dissolves the impurities and not the substance that is to be purified. Liquid-solid extraction may be carried out by simply mixing the liquid and solid with agitation, and then allowing the liquid to separate by standing quietly. Alternatively, liquid-solid extraction may be carried out by simply allowing the liquid to remain in contact with the solid without agitation for a sufficient period of time to allow the impurities to be absorbed by the absorbent solid.

The method and system of the present invention in its preferred embodiment operates as a two-phase system wherein a hydrophobic absorbent extracts one or more terpenoids from water, and therefore from aquaculture products such as fish in the water, with the formation of a terpenoid-depleted water phase and a terpenoid-enriched absorbent phase.

In accordance with the method of the invention, the terpenoid-enriched absorbent phase is left in said water for a time period sufficient to undergo thermal, photo, or oxidative degradation or evaporation.

In accordance with the method of the invention, the terpenoid-enriched absorbent phase is removed from said water following sufficient extraction of said terpenoids. The terpenoids can then be degraded by a thermal, chemical, and/or biological process and the hydrophobic absorbent thereby recovered and reused, disposed of, or used in another application.

In a preferred embodiment, one or more hydrophobic absorbents may be used to extract said terpenoids from the water. The terpenoids cannot then be absorbed by aquaculture products in the water, thereby reducing or eliminating off-flavor in such products. Aquaculture products can be kept in the water for a time period sufficient for the off-flavor to reach acceptable levels through desorption of the terpenoids from the fatty tissues of the aquaculture products or through degradation or metabolism of said terpenoids by said aquaculture products.

In accordance with the method of the invention, the hydrophobic absorbent is a hydrophobic hydrocarbon based solid such as a polymer, wax, hydrogenated vegetable oil, refined vegetable oil, or combinations and variations thereof.

In accordance with the method of the invention, the hydrophobic hydrocarbon based solid is a natural polymer such as gutta percha, latex rubber from plants, natural rubber, or combinations and variations thereof.

In accordance with the method of the invention, the hydrophobic hydrocarbon based solid is a synthetic polymer such as polystyrene, polyethylene, synthetic rubber, nylons, polyacrylonitrile, ester derivatives of polyglycols, ether derivatives of polyglycols, polyvinyl chloride, polybutadine, polyisobutylene, polyimides, polymethyl methacrylate, polyvinyl acetate, polyvinyl alcohol, or combinations and variations thereof.

In accordance with the method of the invention, the hydrophobic hydrocarbon based solid is a wax which is characterized as unctuous, fusible, and/or variably viscous to solid substances; having a characteristic waxy luster;

insoluble in water but soluble in most organic solvents; extremely susceptible to changes in temperature and their origin; variable in origin, composition, and color; and usually composed of high molecular weight substances.

In accordance with the method of the invention, the wax is an animal wax such as spermaceti, beeswax, stearic acid, chinese wax, or combinations and variations thereof.

In accordance with the method of the invention, the wax is a plant wax such as carnauba, japan, bayberry, candelilla, or combinations and variations thereof.

In accordance with the method of the invention, the wax is a mineral wax such as ozocerite, montan, ceresin, paraffin, microcrystalline petroleum, petrolatum, or combinations and variations thereof.

In accordance with the method of the invention, the wax is a synthetic wax such as medium weight polyethylenes, polyethylene glycols, polyoxyethylene esters, chloronaphthalenes, sorbitols, chlorotricluoroethylene resins, or combinations and variations thereof.

In accordance with the method of the invention, the hydrophobic hydrocarbon based solid is a hydrogenated vegetable oil such as hydrogenated canola oil, vegetable shortening, hydrogenated corn oil, saturated vegetable oil, partially-saturated vegetable oil, or combinations and variations thereof.

In accordance with the method of the invention, the hydrophobic hydrocarbon based solid is a refined vegetable oil such as margarine or variations thereof.

In accordance with the method of the invention, the hydrophobic absorbent is a water immiscible hydrophobic liquid such as a plant oil, mineral oil, synthetic motor oil, animal oil, an organic solvent, or combinations and variations thereof.

In accordance with the method of the invention, the water immiscible hydrophobic liquid is a plant oil such as oil derived from corn, sesame, lesquerella, meadowfoam, canola, flaxseed, perilla, oiticica, olive, soybean, cotton seed, peanut, borage, castor, cocoa butter, coconut, evening primrose, grapestone, jojoba, linseed, palm, palm kernel, rapeseed, safflower, shea butter, sunflower, sweet almond, tung, wheat germ, or combinations and variations thereof.

In accordance with the method of the invention, the water immiscible hydrophobic liquid is a mineral oil such as white oil, petrolatum jelly, chlorinated paraffin, or combinations and variations thereof.

In accordance with the method of the invention, the water immiscible hydrophobic liquid is synthetic motor oil or variations thereof.

In accordance with the method of the invention, the water immiscible hydrophobic liquid is an animal oil such as cod liver oil, fish oil, lanolin, lard oil, mink oil, neatsfoot oil, tallow oil, woolgrease, fish oil concentrates, or combinations and variations thereof.

In accordance with the method of the invention, the water immiscible hydrophobic liquid is an organic solvent such as chloroform, liquid alkanes including hexane, pentane, and cyclohexane, liquid alkenes, liquid alkynes, or combinations and variations thereof.

In accordance with the method of the invention, combinations of the hydrophobic hydrocarbon based solids can be readily optimized by those of ordinary skill in the art.

In accordance with the method of the invention, combinations of the water immiscible hydrophobic liquids can be readily optimized by those of ordinary skill in the art.

In accordance with the method of the invention, combinations of the hydrophobic hydrocarbon based solids and the water immiscible hydrophobic liquids can be readily optimized by those of ordinary skill in the art.

In accordance with the method of the invention, variations of the hydrophobic hydrocarbon based solids and the water immiscible hydrophobic liquids include analogues, homologues and variations in molecular weight, molecular weight distribution, chain branching, copolymers and chain termination groups which can be readily optimized by those of ordinary skill in the art.

In accordance with the method of the invention, corn oil is used as the hydrophobic absorbent and, being lighter than water, floats on top of the water. Corn oil is used due to its high degree of unsaturation, ability to degrade dissolved organic compounds when exposed to sunlight and air, low cost, and environmental friendliness.

All hydrophobic terpenoid reduction tests and treatments were subjected to the same conditions (except for exposure to light and concentrations of compounds as noted herein) and conducted in the same manner indoors, in a laboratory setting, and at ambient room temperature. All tests used de-ionized water and all samples were handled in the same manner and under otherwise identical conditions. Each hydrophobic absorbent was added to water in separate containers. Crisco®, a hydrogenated vegetable oil, and Johnson & Johnson® wax, a carnauba plant wax, were used in certain test treatments utilizing hydrophobic hydrocarbon based solids.

FIG. 1 and Table 1 show the percent reduction in geosmin at about 100 parts per billion (ppb) concentration from 5 gallons of water when 0 milliliters (0 mL) of corn oil (control), 1 mL of corn oil, and 5 mL of corn oil was separately added, respectively, to water in three different containers. Reduction percentages were measured at a 3-hour and a 24-hour exposure time period for each water container which had different quantities of corn oil added. The treatments were not stirred but left untouched for the entire test period. Treatments were exposed to natural sunlight and fluorescent light during daylight hours and to natural darkness during nighttime hours during the 24-hour test period. The resulting reduction percentages for 0 mL (control), 1 mL, and 5 mL of corn oil added, measured at 3 hours, show 0%, 5.0%, and 15.2% reductions in geosmin, respectively. The resulting reduction percentages for the same amounts of corn oil added, measured at 24 hours, show 0%, 52.3%, and 85.7% reductions in geosmin, respectively.

Figure 2:
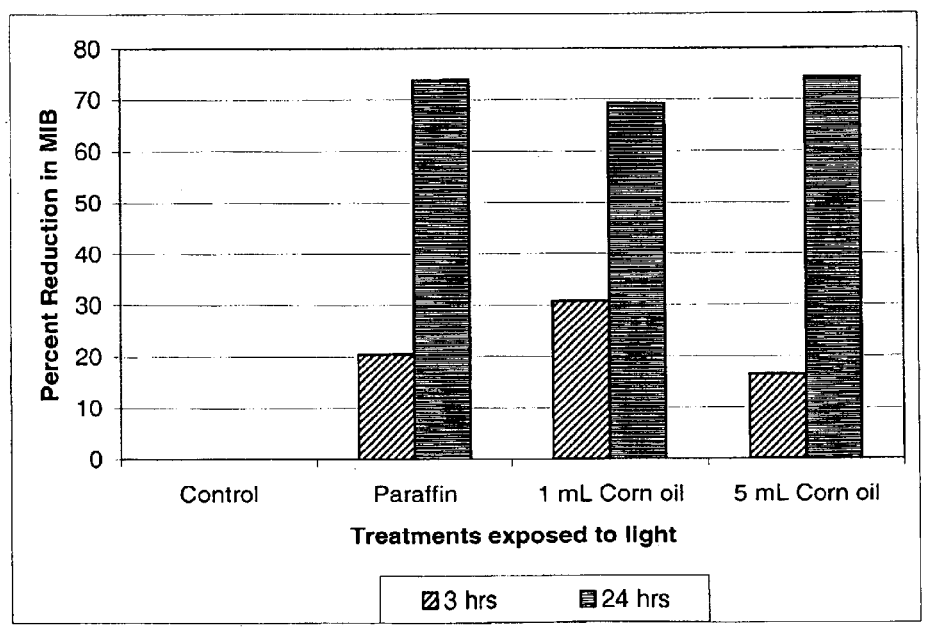
FIG. 2 is a graphical illustration of the percent reduction in MIB from 2 gallons of water vs. no additive (control), 10 grams (g) of solid paraffin wax, 1 mL of corn oil, and 5 mL of corn oil, respectively, measured at a 3-hour and a 24-hour exposure time period for treatments exposed to constant light.

FIG. 2 and Table 2 show the percent reduction in MIB at about 100 ppb concentration in different containers with 2 gallons of water that had no additive (control), 10 grams (g) of solid paraffin wax, 1 mL of corn oil, and 5 mL of corn oil, respectively, added to the water. The paraffin wax used in all tests was in the form of wax strips which were weighted and submerged. The treatments were stirred with a magnetic stirrer for the entire test period to simulate moving water in an actual aquaculture pond or environment. All treatments were exposed to light using an actinic light bulb for the entire 24-hour period. All subsequent tests and treatments (shown in the results of FIGS. 3 through 6) also utilized a magnetic stirrer for the entire test period. The reduction percentages were measured at a 3-hour and a 24-hour exposure time period for each additive. The resulting reduction percentages for each additive, measured at 3 hours, show 0% (control), 21.0% (10 g paraffin wax), 31.0% (1 mL corn oil) and 16.0% (5 mL corn oil) reductions in MIB, respectively, for treatments exposed to constant light. The resulting reduction percentages for the same amounts and types of additives, measured at 24 hours, show 0% (control), 74.0%, 69.0%, and 74.0% reductions in MIB, respectively, for treatments exposed to constant light.

Figure 3:
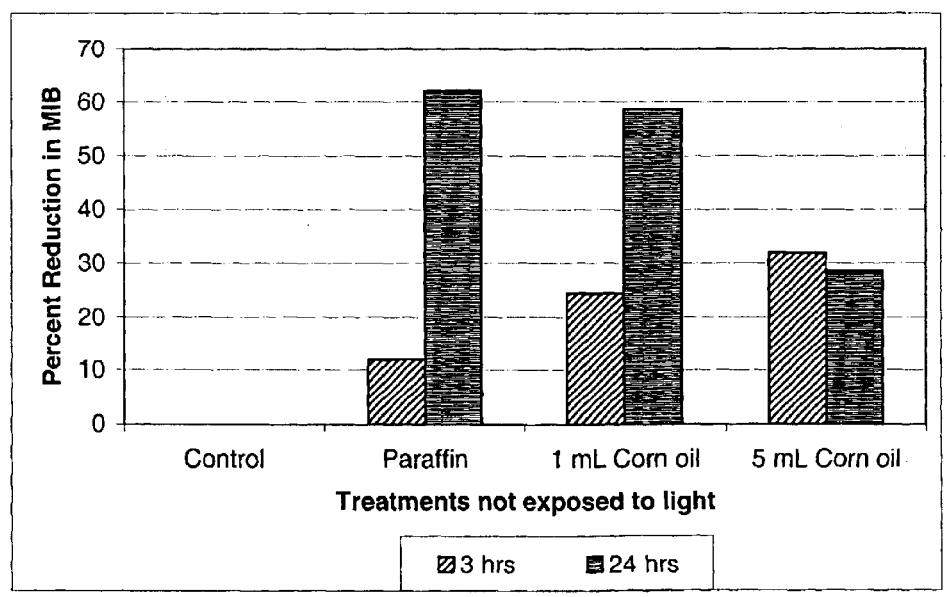
FIG. 3 is a graphical illustration of the percent reduction in MIB from 2 gallons of water vs. no additive (control), 10 g of solid paraffin wax, 1 mL of corn oil, and 5 mL of corn oil, respectively, measured at a 3-hour and a 24-hour exposure time period for treatments not exposed to light.

FIG. 3 and Table 3 show test results using the same additives, quantities, concentrations, and exposure time periods as the test in FIG. 2 for treatments that were covered with aluminum foil and were not exposed to any light for 24 hours. The resulting reduction percentages for each additive, measured at 3 hours, show 0% (control), 12.0% (10 g paraffin wax), 25.0% (1 mL corn oil), and 32.0% (5 mL corn oil) reductions in MIB, respectively. The resulting reduction percentages for each additive, measured at 24 hours, show 0% (control), 62.0%, 59.0%, and 29.0% reductions in MIB, respectively. Comparison of the results from the tests shown in FIGS. 2 and 3 indicates that some photodegradation occurs when treating water with these additives to further reduce MIB in the water and that exposure to light and/or heat increases the reduction percentages in MIB when using these absorbents.

Figure 4:
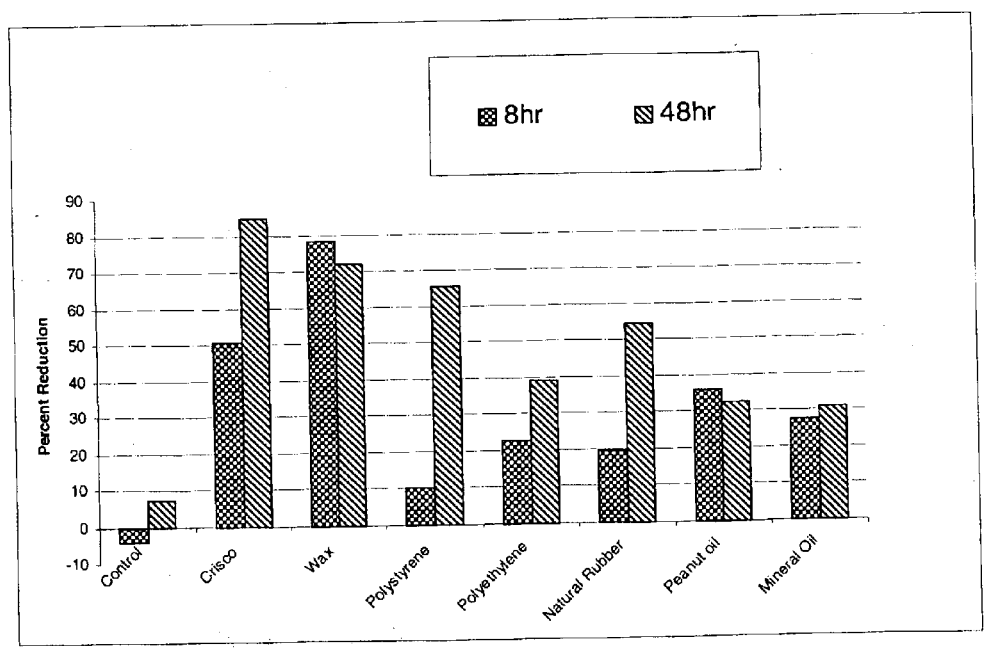
FIG. 4 is a graphical illustration of the percent reduction in geosmin from 1 liter of water vs. no additive (control), Crisco®, Johnson & Johnson® wax, polystyrene, polyethylene, and natural rubber added, respectively, (all added at 1.43 g/L), and peanut oil and mineral oil added, respectively, (added at 710 $\mu L/$), measured at an 8-hour and a 48-hour exposure time period.

FIG. 4 and Table 4 show the percent reduction in geosmin at 50 ppb concentration from various containers with 1 liter of water that had no additive (control), 1.43 grams per liter of Crisco®, Johnson & Johnson® wax, polystyrene, polyethylene, and natural rubber, respectively, and 710 microliters ($\mu$L) per liter of peanut oil and mineral oil, respectively, add to the water. Treatments were exposed to natural sunlight and fluorescent light during daylight hours and to natural darkness during nighttime hours during the 48-hour test period. The polystyrene, polyethylene, and natural rubber solids were enclosed in a porous, nylon mesh bag which was weighted and submerged. The reduction percentages were measured at an 8-hour and a 48-hour exposure time period for each additive. The resulting reduction percentages for each additive, measured at 8 hours, show various reductions in geosmin levels depending upon the hydrophobic absorbent, oil or solid, additive. Likewise, the resulting reduction percentages for the same amounts and types of additives, measured at 48 hours, show various reductions in geosmin levels. Generally, test results show that all compound additives used reduced the amount of geosmin in the water by at least 30% after 48 hours. The controls (no compound added) showed an increase in geosmin of 4.0% after 8 hours and a reduction in geosmin of 7.3% after 48 hours, due likely to experimental error and limited volatilization, respectively. Table 4 shows the data for percentage reductions in geosmin for each hydrophobic compound added.

Figure 5:
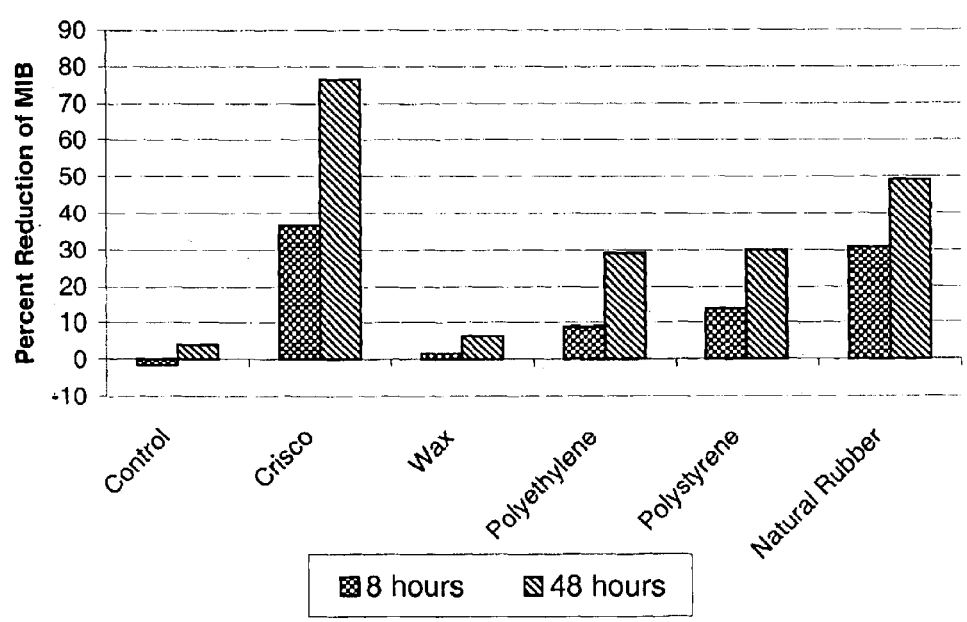
FIG. 5 is a graphical illustration of the percent reduction of MIB from 1 liter of water vs. no additive (control), Crisco®, Johnson & Johnson® wax, polyethylene, polystyrene, and natural rubber added, respectively, (all added at 1.43 g/L), measured at an 8-hour and a 48-hour exposure time period.

FIG. 5 and Table 5 show the percent reduction of MIB at about 50 ppb concentration from various containers with 1 liter of water that had no additive (control) or 1.43 grams per liter (g/L) of Crisco®, Johnson & Johnson® wax, polyethylene, polystyrene, and natural rubber, respectively, added to the water. Treatments were exposed to natural sunlight and fluorescent light during daylight hours and to natural darkness during nighttime hours during the 48-hour test period. The reduction percentages were measured at an 8-hour and a 48-hour exposure time period for each additive. The control (no compound added) showed an increase in MIB of 1.6% after 8 hours and a reduction in MIB of 4.2% after 48 hours, due likely to experimental error and limited volatilization, respectively. The resulting reduction percentages for each solid additive, measured at 8 hours, show various reductions in MIB levels depending upon the hydrophobic solid additive. Likewise, the resulting reduction percentages for the same amounts and types of additives, measured at 48 hours, show various reductions in MIB levels.

Figure 6:
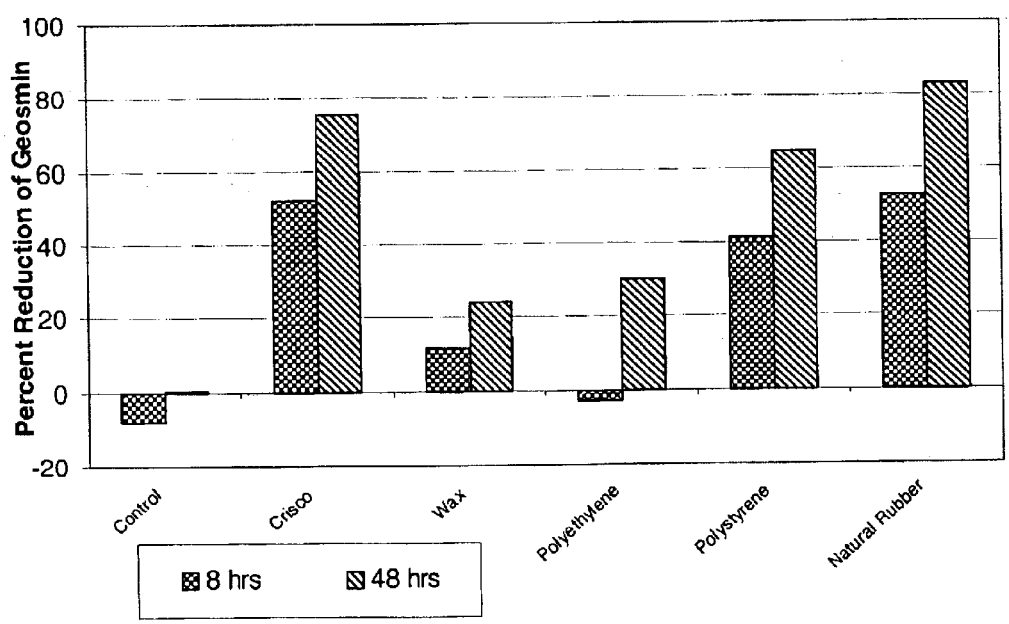
FIG. 6 is a graphical illustration of the percent reduction of geosmin from 1 liter of water vs. no additive (control), Crisco®, Johnson & Johnson® wax, polyethylene, polystyrene, and natural rubber added, respectively, (all added at 1.43 g/L), measured at an 8-hour and a 48-hour exposure time period.

FIG. 6 and Table 6 show the percent reduction of geosmin at about 50 ppb concentration from various containers with 1 liter of water that had no additive (control) and 1.43 grams per liter (g/L) of Crisco®, Johnson & Johnson® wax, polyethylene, polystyrene, and natural rubber, respectively, added to the water. This test was an exact replication of that test done with geosmin, as shown in FIG. 4, but using the same hydrophobic solids only. Treatments were exposed to natural sunlight and fluorescent light during daylight hours and to natural darkness during nighttime hours during the 48-hour test period. The reduction percentages were again measured at an 8-hour and a 48-hour exposure time period for each solid additive. The control (no compound added) showed an increase in geosmin of 8.2% after 8 hours and a reduction in geosmin of 0.4% after 48 hours, due likely to experimental error and limited volatilization, respectively. The resulting reduction percentages for each additive, measured at 8 hours, show various reductions in geosmin levels depending upon the hydrophobic solid added. Likewise, the resulting reduction percentages for the same amounts and types of additives, measured at 48 hours, show various reductions in geosmin levels. The polyethylene treatment showed at increase in geosmin of 2.8% after 8 hours, due likely to experimental error and/or the inherent difficulty in measuring small amounts (parts per billion) of compounds. However, the reduction percentages when using natural rubber as the additive increased significantly over the previous test and treatments.

The absorption properties of the hydrophobic compounds tested and their alternatives, known to those skilled in the art, proved to be an effective method for controlling geosmin and MIB and may prove to effectively control heretofore unidentified and other known cyanobacteria, algae, or other terpenoid compounds in water and aquaculture products.

In another embodiment of the present invention, the water contacts at least one water transporting means that moves or transports the water. The water transporting means can be any pump, aerator, paddlewheel, or any other means known to those of ordinary skill in the art that moves or transports water and brings the water to the hydrophobic absorbent.

In another embodiment of the invention, the hydrophobic absorbent is placed in at least one porous container that contains the absorbent and that is in contact with the water and allows the water to filter or flow through the container and absorbent either naturally or by use of a water transporting means. The container can be any filter, bag, trap, screened cage, and others known to the artisan of ordinary skill. The container allows confinement, collection, recovery, reuse, disposal, or regeneration of the hydrophobic absorbent.

The above is a detailed description of particular embodiments of the present invention. All embodiments disclosed and claimed herein can be easily executed in light of this disclosure. Those of ordinary skill in the art, in light of the present disclosure, should recognize and understand that a wide variety of obvious alternatives, variations, and modifications of the embodiments disclosed herein can be selected and made without departing from the true scope and spirit of the present invention. The invention is described both generically and regarding specific embodiments, while the full scope of the invention is set out in the claims and their equivalents that follow. The specific tests and treatment results presented further explain the invention and are not to be interpreted or inferred as limiting thereof. The claims and specification should not be construed to unduly narrow the complete scope of protection to which the present invention is entitled. The disclosure and appended claims are intended to cover all modifications that may fall within the scope of the claims.

TABLE 1

Treatment Efficiencies for Geosmin Using Corn Oil
Expressed as % Reduction
Sampling Intervals (hrs)

|  | Interval | |
| --- | --- | --- |
|  | 3 | 24 |
| Corn oil (0 mL) (Control) | 0 | 0 |
| Corn oil (1 mL) | 5.0 | 52.3 |
| Corn oil (5 mL) | 15.2 | 85.7 |

Note:
Table 1 corresponds to FIG. 1.
Corn oil was added to 5 gallons of water in separate containers initially containing 100 ppb of geosmin. Treatments were exposed to natural sunlight and fluorescent light during daylight hours and to natural darkness during nighttime hours during the 24-hour test period.

TABLE 2

Treatment Efficiencies for MIB Using Paraffin and Corn Oil
Expressed as % Reduction-Exposed to Light
Sampling Intervals (hrs)

|  | Interval | |
| --- | --- | --- |
|  | 3 | 24 |
| Control | 0 | 0 |
| Paraffin (10 grams) | 21.0 | 74.0 |
| Corn oil (1 mL) | 31.0 | 69.0 |
| Corn oil (5 mL) | 16.0 | 74.0 |

Note:
Table 2 corresponds to FIG. 2.
Paraffin and corn oil were added to 2 gallons of water in separate containers initially containing about 100 ppb of MIB. Treatments were exposed to light for 24 hours using a combination of natural sunlight and an actinic light bulb covering the entire light spectrum.

TABLE 3

Treatment Efficiencies for MIB Using Paraffin and Corn Oil
Expressed as % Reduction-Not Exposed to Light
Sampling Intervals (hrs)

|  | Interval | |
| --- | --- | --- |
|  | 3 | 24 |
| Control | 0 | 0 |
| Paraffin (10 grams) | 12.0 | 62.0 |
| Corn oil (1 mL) | 25.0 | 59.0 |
| Corn oil (5 mL) | 32.0 | 29.0 |

Note:
Table 3 corresponds to FIG. 3.
Paraffin and corn oil were added to 2 gallons of water in separate containers initially containing about 100 ppb of MIB. Treatments were completely covered with aluminum foil and were not exposed to light for 24 hours.

TABLE 4

Treatment Efficiencies for Geosmin Using Various Hydrophobic
Absorbents Expressed as % Reduction
Sampling Intervals (hrs)

|  | Interval | |
| --- | --- | --- |
|  | 8 | 48 |
| Control | −4.0 | 7.3 |
| Crisco ® (1.43 g/L) | 50.5 | 85.0 |
| Johnson & Johnson ® wax (1.43 g/L) | 78.3 | 71.8 |
| Polystyrene (1.43 g/L) | 10.1 | 65.2 |
| Polyethylene (1.43 g/L) | 22.4 | 38.9 |
| Natural Rubber (1.43 g/L) | 19.4 | 54.2 |
| Peanut Oil (710 $\mu$L/L) | 35.7 | 32.5 |
| Mineral Oil (710 $\mu$L/L) | 27.4 | 30.9 |

Note:
Table 4 corresponds to FIG. 4.
The hydrophobic absorbents were added to 1 liter of water in separate containers initially containing 50 ppb of geosmin. Treatments were exposed to natural sunlight and fluorescent light during daylight hours and to natural darkness during nighttime hours during the 48-hour test period.

TABLE 5

Treatment Efficiencies for MIB Using Various Hydrophobic
Absorbents Expressed as % Reduction
Sampling Intervals (hrs)

|  | Interval | |
| --- | --- | --- |
|  | 8 | 48 |
| Control | −1.6 | 4.2 |
| Crisco ® (1.43 g/L) | 36.5 | 76.5 |
| Johnson & Johnson ® wax (1.43 g/L) | 1.6 | 6.5 |
| Polyethylene (1.43 g/L) | 9.0 | 29.2 |
| Polystyrene (1.43 g/L) | 13.7 | 30.0 |
| Natural Rubber (1.43 g/L) | 30.1 | 49.0 |

Note:
Table 5 corresponds to FIG. 5.
The hydrophobic absorbents were added to 1 liter of water in separate containers initially containing about 50 ppb of MIB. Treatments were exposed to natural sunlight and fluorescent light during daylight hours and to natural darkness during nighttime hours during the 48-hour test period.

TABLE 6

Treatment Efficiencies for Geosmin Using Various Hydrophobic
Absorbents Expressed as % Reduction
Sampling Intervals (hrs)

|  | Interval | |
| --- | --- | --- |
|  | 8 | 48 |
| Control | −8.2 | 0.4 |
| Crisco ® (1.43 g/L) | 51.8 | 75.3 |
| Johnson & Johnson ® wax (1.43 g/L) | 11.7 | 24.2 |
| Polyethylene (1.43 g/L) | −2.8 | 30.2 |

TABLE 6-continued

Treatment Efficiencies for Geosmin Using Various Hydrophobic Absorbents Expressed as % Reduction
Sampling Intervals (hrs)

| | Interval | |
|---|---|---|
| | 8 | 48 |
| Polystyrene (1.43 g/L) | 41.4 | 64.6 |
| Natural Rubber (1.43 g/L) | 52.7 | 82.9 |

Note:
Table 6 corresponds to FIG. 6.
The hydrophobic absorbents were added to 1 liter of water in separate containers initially containing about 50 ppb of geosmin. Treatments were exposed to natural sunlight and fluorescent light during daylight hours and to natural darkness during nighttime hours during the 48-hour test period.

What is claimed is:

1. A method for extracting terpenoids from water, comprising the steps of:
   extracting one or more said terpenoids from said water with a water-insoluble hydrophobic sorbent with the formation of a terpenoid-depleted water phase and a terpenoid-enriched sorbent phase and leaving the solvent phase in said water to undergo degradation or evaporation.

2. The method according to claim 1, further comprising the step of:
   leaving said terpenoid-enriched sorbent phase in said water to undergo thermal, photo, or oxidative degradation or evaporation.

3. The method according to claim 1, further comprising the step of:
   removing said terpenoid-enriched sorbent phase from said water following extraction of said terpenoids from said water.

4. The method according to claim 1, wherein said water contains aquaculture products.

5. The method according to claim 4, wherein said aquaculture products are fish.

6. The method according to claim 4, wherein said aquaculture products are shellfish.

7. The method according to claim 5, wherein said fish are channel catfish.

8. The method according to claim 1, wherein said hydrophobic sorbent is a hydrophobic hydrocarbon based solid.

9. The method according to claim 8, wherein said hydrophobic hydrocarbon based solid is a polymer.

10. The method according to claim 9, wherein said polymer is naturally occurring.

11. The method according to claim 10, wherein said naturally occurring polymer is gutta percha, latex rubber from plants, natural rubber, or a mixture thereof.

12. The method according to claim 9, wherein said polymer is synthetic.

13. The method according to claim 12, wherein said synthetic polymer is selected from the group consisting of polystyrene, polyethylene, synthetic rubber, nylons, polyacrylonitrile, ester derivatives of polyglycols, ether derivatives of polyglycols, polyvinyl chloride, polybutadine, polyisobutylene, polyimides, polymethyl methacrylate, polyvinyl acetate, polyvinyl alcohol, and mixtures thereof.

14. The method according to claim 8, wherein said hydrophobic hydrocarbon based solid is wax.

15. The method according to claim 14, wherein said wax is animal wax.

16. The method according to claim 15, wherein said animal wax is spermaceti, beeswax, stearic acid, chinese wax, or a mixture thereof.

17. The method according to claim 14, wherein said wax is plant wax.

18. The method according to claim 17, wherein said plant wax is carnauba, japan, bayberry, candelilla, or a mixture thereof.

19. The method according to claim 14, wherein said wax is mineral wax.

20. The method according to claim 19, wherein said mineral wax is ozocerite, montan, ceresin, paraffin, microcrystalline petroleum, petrolatum, or a mixture thereof.

21. The method according to claim 14, wherein said wax is synthetic wax.

22. The method according to claim 21, wherein said synthetic wax is selected from the group consisting of polyethylenes, polyethylene glycols, polyoxyethylene esters, chloronaphthalenes, sorbitols, chiorotricluoroethylene resins, and mixtures thereof.

23. The method according to claim 8, wherein said hydrophobic hydrocarbon based solid is hydrogenated vegetable oil.

24. The method according to claim 23, wherein said hydrogenated vegetable oil is hydrogenated canola oil, vegetable shortening, hydrogenated corn oil, saturated vegetable oil, partially-saturated vegetable oil, or a mixture thereof.

25. The method according to claim 8, wherein said hydrophobic hydrocarbon based solid is refined vegetable oil.

26. The method according to claim 25, wherein said refined vegetable oil is margarine.

27. The method according to claim 1, wherein said hydrophobic sorbent is water immiscible hydrophobic liquid.

28. The method according to claim 27, wherein said water immiscible hydrophobic liquid is plant oil.

29. The method according to claim 28, wherein said plant oil is corn oil, sesame oil, lesquerella oil, meadowfoam oil, canola oil, flaxseed oil, perilla oil, oiticica oil, olive oil, soybean oil, cotton seed oil, peanut oil, borage oil, castor oil, cocoa butter oil, coconut oil, evening primrose oil, grapestone oil, jojoba oil, linseed oil, palm oil, palm kernel oil, rapeseed oil, safflower oil, shea butter oil, sunflower oil, sweet almond oil, tung oil, wheat germ oil, or a mixture thereof.

30. The method according to claim 27, wherein said water immiscible hydrophobic liquid is mineral oil.

31. The method according to claim 30, wherein said mineral oil is white oil, petrolatum jelly, chlorinated paraffin, or a mixture thereof.

32. The method according to claim 27, wherein said water immiscible hydrophobic liquid is synthetic motor oil.

33. The method according to claim 27, wherein said water immiscible hydrophobic liquid is animal oil.

34. The method according to claim 33, wherein said animal oil is selected from the group consisting of cod liver oil, fish oil, lanolin, lard oil, mink oil, neatsfoot oil, tallow oil, woolgrease, fish oil concentrates, and mixtures thereof.

35. The method according to claim 27, wherein said water immiscible hydrophobic liquid is organic solvent.

36. The method according to claim 35, wherein said organic solvent is chloroform, liquid alkanes, liquid alkenes, liquid alkynes, or a mixture thereof.

37. The method according to claim 1, wherein said hydrophobic sorbent is selected from the group consisting of hydrophobic hydrocarbon based solids, water immiscible hydrophobic liquids, and mixtures thereof.

38. The method according to claim 1, wherein said terpenoids are geosmin.

39. The method according to claim 1, wherein said terpenoids are 2-methylisoborneol.

40. The method according to claim 1, wherein said terpenoids are 2-isopropyl-2-methyloxypyrazine.

41. The method according to claim 1, wherein said terpenoids are geosmin, 2-methylisoborneol, 2-isopropyl-2-methyloxypyrazine, or a mixture thereof.

42. The method according to claim 1, wherein said hydrophobic sorbent decreases the concentration of said terpenoids in aquaculture products inhabiting said water.

43. The method according to claim 42, wherein said aquaculture products are fish.

44. The method according to claim 43, wherein said fish are channel catfish.

45. A method for extracting terpenoids from water, comprising the steps of:
   placing one or more water-insoluble hydrophobic sorbents in one or more porous containers;
   placing said porous containers in said water;
   extracting one or more said terpenoids from said water with said water-insoluble hydrophobic sorbents with the formation of a terpenoid-depleted water phase and a terpenoid-enriched sorbent phase and leaving the solvent phase in said water to undergo degradation or evaporation.

46. The method according to claim 45, further comprising the step of:
   removing said terpenoid-enriched sorbent phase contained in said porous containers from said water following extraction of said terpenoids from said water.

47. The method according to claim 45, wherein said terpenoids are geosmin, 2-methylisoborneol, 2-isopropyl-2-methyloxypyrazine, or a mixture thereof.

48. The method according to claim 45, wherein said hydrophobic sorbents are selected from the group consisting of hydrophobic hydrocarbon based solids, water immiscible hydrophobic liquids, and mixtures thereof.

49. The method according to claim 45, wherein said hydrophobic sorbent decreases the concentration of said terpenoids in aquaculture products inhabiting said water.

50. The method according to claim 49, wherein said aquaculture products are fish.

51. The method according to claim 50, wherein said fish are channel catfish.

52. A method for extracting terpenoids from water, comprising the steps of:
   placing one or more water-insoluble hydrophobic sorbents in one or more transporting means;
   extracting one or more said terpenoids from said water with said water-insoluble hydrophobic sorbents with the formation of a terpenoid-depleted water phase and a terpenoid-enriched sorbent phase and leaving the solvent phase in said water to undergo degradation or evaporation.

53. The method according to claim 52, further comprising the step of:
   removing said terpenoid-enriched sorbent phase from said transporting means following extraction of said terpenoids from said water.

54. The method according to claim 52, wherein said transporting means moves said water through said hydrophobic sorbent.

55. The method according to claim 52, wherein said terpenoids are geosmin, 2-methylisoborneol, 2-isopropyl-2-methyloxypyrazine, or a mixture thereof.

56. The method according to claim 52, wherein said hydrophobic sorbents are selected from the group consisting of hydrophobic hydrocarbon based solids, water immiscible hydrophobic liquids, and mixtures thereof.

57. The method according to claim 52, wherein said hydrophobic sorbent decreases the concentration of said terpenoids in aquaculture products inhabiting said water.

58. The method according to claim 57, wherein said aquaculture products are fish.

59. The method according to claim 58, wherein said fish are channel catfish.

* * * * *